(12) United States Patent
Kawai

(10) Patent No.: US 11,288,817 B2
(45) Date of Patent: Mar. 29, 2022

(54) IMAGE PROCESSING DEVICE, STATIONARY OBJECT TRACKING SYSTEM, IMAGE PROCESSING METHOD, AND RECORDING MEDIUM

(71) Applicant: NEC Corporation, Tokyo (JP)

(72) Inventor: Ryo Kawai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/599,245

(22) Filed: Oct. 11, 2019

(65) Prior Publication Data

US 2020/0042778 A1 Feb. 6, 2020

Related U.S. Application Data

(63) Continuation of application No. 16/339,782, filed as application No. PCT/JP2016/004626 on Oct. 19, 2016, now Pat. No. 11,049,260.

(51) Int. Cl.
*G06K 9/00* (2006.01)
*G06T 7/246* (2017.01)

(52) U.S. Cl.
CPC .......... *G06T 7/246* (2017.01); *G06K 9/00342* (2013.01); *G06K 9/00369* (2013.01); *G06K 9/00718* (2013.01); *G06T 7/248* (2017.01); *G06T 2207/10016* (2013.01); *G06T 2207/30196* (2013.01); *G06T 2207/30232* (2013.01)

(58) Field of Classification Search
CPC ........... G06K 9/00342; G06K 9/00369; G06K 9/00718; G06T 7/246; G06T 2207/10016; G06T 2207/30196; G06T 2207/30232; G06T 7/248; G06T 7/20; G06T 7/254
See application file for complete search history.

(56) References Cited

U.S. PATENT DOCUMENTS

2008/0247599 A1 10/2008 Porikli et al.
2013/0329958 A1* 12/2013 Oami ................. G06T 7/20
                                                    382/103

(Continued)

FOREIGN PATENT DOCUMENTS

JP  2009-048428 A  3/2009
JP  2010-271876 A  12/2010

(Continued)

OTHER PUBLICATIONS

International Search Report for PCT Application No. PCT/JP2016/004626, dated Jan. 17, 2017.

(Continued)

*Primary Examiner* — Tom Y Lu

(57) ABSTRACT

Provided is a technique for extracting information with which it is possible to track an object to be tracked, even if it happens that the object to be tracked is hidden or the like. This image processing device is provided with: a moving region identification unit which identifies, in a video, the image region associated with a moving object shown in the video; a stationary region identification unit which identifies, in the video, the image region associated with a stationary object shown in the video; and an extraction unit which extracts a feature of a partial image that is included in the image region associated with the stationary object, and that does not overlap the image region associated with the moving object.

9 Claims, 13 Drawing Sheets

(56) References Cited

U.S. PATENT DOCUMENTS

| | | | |
|---|---|---|---|
| 2014/0348382 A1* | 11/2014 | Sasatani | G06T 7/73 382/103 |
| 2014/0369555 A1 | 12/2014 | Zhong et al. | |
| 2015/0120237 A1 | 4/2015 | Gouda et al. | |
| 2015/0125032 A1 | 5/2015 | Yamanaka et al. | |
| 2015/0324656 A1 | 11/2015 | Marks et al. | |
| 2018/0068448 A1 | 3/2018 | Rastgar | |

FOREIGN PATENT DOCUMENTS

| | | | | |
|---|---|---|---|---|
| JP | 2011-043863 A | 3/2011 | | |
| JP | 5027741 B2 | 9/2012 | | |
| JP | 5058010 B2 | 10/2012 | | |
| JP | 5523900 B2 | 6/2014 | | |
| JP | 2015-184810 A | 10/2015 | | |
| JP | 2015-216635 A | 12/2015 | | |
| WO | WO 2009/103996 | * | 8/2009 | G06K 9/00 |

OTHER PUBLICATIONS

English translation of Written opinion for PCT Application No. PCT/JP2016/004626.
U.S. Notice of Allowability for U.S. Appl. No. 16/599,259 dated Sep. 3, 2020.

* cited by examiner

32   IMAGE FRAME IF1

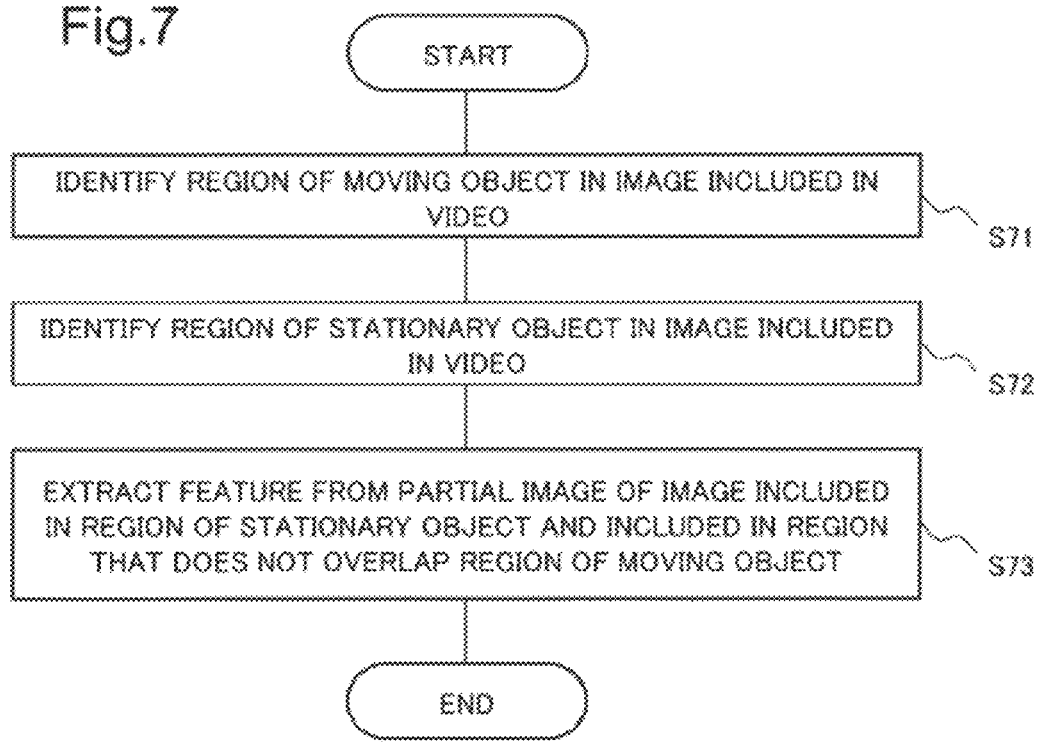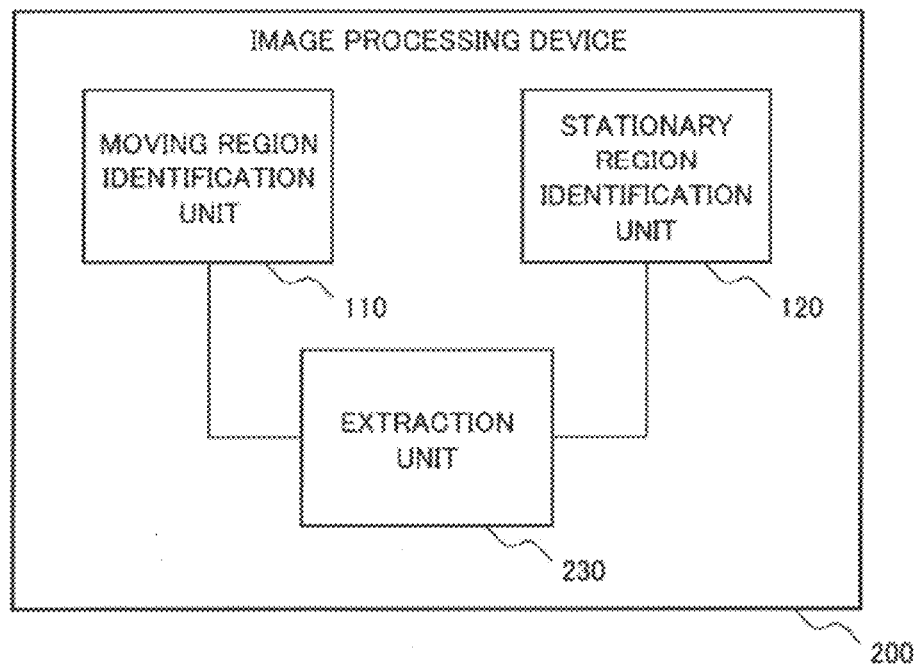

IMAGE PROCESSING DEVICE, STATIONARY OBJECT TRACKING SYSTEM, IMAGE PROCESSING METHOD, AND RECORDING MEDIUM

REFERENCE TO RELATED APPLICATION

This present application is a Continuation Application of Ser. No. 16/339,782 filed on Apr. 5, 2019, which is a National Stage Entry of International Application PCT/JP2016/004626 filed on Oct. 19, 2016, the disclosures of all of which are incorporated in their entirety by reference herein.

TECHNICAL FIELD

The present disclosure relates to an image processing device, a stationary object tracking system, an image processing method, and a recording medium.

BACKGROUND ART

One of typical behavior of a suspicious person in a public place is stationary behavior. The stationary behavior is considered as a sign of a crime such as a pickpocket. Discovering the stationary behavior by a surveillance camera and the like conceivably leads to prevention of crime beforehand. However, a guard generally takes charge of monitoring a plurality of cameras and cannot carefully observe a specific camera. Thus, it is difficult for a person to discover, by a visual inspection, a stationary state that cannot be discovered unless a careful observation is made for a long time. Accordingly, a technology for automatically detecting a stationary person from a video of a surveillance camera and the like is proposed.

For example, PTL 1 describes a technique of generating a background image based on a frequency of appearance of a pixel value from each of a video captured in a long period and a video captured in a shorter period, and detecting an object being left behind by taking a difference between the two background images.

Further, various methods of tracking a person from an image are proposed. For example, PTL 2 describes a method of estimating a common region included in common between images acquired by different cameras, extracting a feature quantity from an image associated with the estimated common region, and associating the feature quantity with an image of a person being an object to be verified between a plurality of time-series images. Further, PTL 3 describes a method of determining whether or not people in two images included in a detected human body region is the same person.

Further, when tracking of an object to be tracked is performed, concealment of the object to be tracked by another object and the like located between a camera and the object to be tracked, and the like may occur. For example, PTL 4 describes a method of tracking an object to be tracked when concealment occurs. PTL 4 describes a technique of extracting an image of a constituent portion of an object being an object to be monitored from an image by using an observation region image of a specific portion model that is obtained by excluding a region concealed by another specific portion model of the object from an entire region image of the specific portion model of the object by using a model for each of a plurality of constituent portions of the object.

Further, PTL 5 describes, as one example of a method of tracking a person, using an image captured by a visible light camera and an image captured by an infrared camera.

CITATION LIST

Patent Literature

[PTL 1] Japanese Patent No. 5058010
[PTL 2] Japanese Unexamined Patent Application Publication No. 2015-184810
[PTL 3] Japanese Patent No. 5523900
[PTL 4] Japanese Patent No. 5027741
[PTL 5] Japanese Unexamined Patent Application Publication No. 2015-216635

SUMMARY OF INVENTION

Technical Problem

A stationary person being an object to be tracked is highly likely to be concealed by another person in an actual environment. However, the techniques described in PTLs 2 and 3 do not disclose a method of associating a stationary person in a state where an object to be tracked is concealed.

Further, in a case where the same person stays stationary for a plurality of times, suspicion is further increased. In order to discover such a stationary person who stays stationary for a plurality of times, the stationary person needs to be continuously tracked. In the technique described in PTL 4, tracking is performed when at least a part of a stationary person is continuously captured in a video. Therefore, when concealment or frame-out of such a stationary person occurs, tracking of the stationary person is interrupted, and a plurality of stationary states of the stationary person may not be able to be detected in the technique of PTL 4.

Further, when using the technique of tracking an object to be tracked for a use of general monitoring is considered, the method described in PTL 5 is not realistic in a point that new equipment needs to be introduced in addition to an existing surveillance camera.

Therefore, when a technique related to PTLs 1 to 5 mentioned above is used for tracking a stationary person, many people and objects cross in front of a stationary person and conceal the stationary person in a crowded environment, and thus tracking may fail during the tracking. For example, when tracking continues in a case where a stationary person is not included in a captured image due to occurrence of concealment of the stationary person, tracking of a stationary person may be performed by using a feature of a person who is concealing the stationary person. In such a case, a feature different from an intended feature of the stationary person is verified with a feature of the stationary person since a feature of a person different from the stationary person is used, and thus tracking of the stationary person may be interrupted.

The present disclosure has been made in view of the above-mentioned problem, and an object thereof is to provide a technique of extracting information with which an object to be tracked can be tracked even when concealment and the like occur.

Solution to Problem

An image processing device according to one aspect of the present disclosure includes a moving region identification means for identifying a region, in an image included in a video, of a moving object included in the video, a stationary region identification means for identifying a region, in the image, of a stationary object included in the video, and an extraction means for extracting a feature from a partial image of the image that is a partial image included in a region of the stationary object and is included in a region that does not overlap a region of the moving object.

Further, a stationary object tracking system according to one aspect of the present disclosure includes the image processing device, a capturing means for capturing the video, and a verification means for performing verification of a stationary object included in the video by using a feature extracted by the extraction means.

Further, an image processing method according to one aspect of the present disclosure includes identifying a region, in an image included in a video, of a moving object included in the video, identifying a region, in the image, of a stationary object included in the video, and extracting a feature from a partial image of the image that is a partial image included in a region of the stationary object and is included in a region that does not overlap a region of the moving object.

Note that, a computer program that achieves the image processing device, the stationary object tracking system, or the image processing method mentioned above by a computer, and a computer-readable non-temporary recording medium that stores the computer program are also included in the scope of the present disclosure.

Advantageous Effects of Invention

The present disclosure is able to provide a technique of extracting information with which an object to be tracked can be tracked even when concealment and the like occur.

BRIEF DESCRIPTION OF DRAWINGS

FIG. 7 is a flowchart illustrating one example of a flow of processing of the image processing device according to the first example embodiment.

FIG. 8 is a block diagram illustrating one example of a configuration of an image processing device according to a second example embodiment.

EXAMPLE EMBODIMENT

1 First Example Embodiment (1.1 Outline)

A first example embodiment of the present disclosure is described below. In an image processing device according to the first example embodiment, a region of a stationary object and a region of a moving object are each identified from an input video, and a portion of the region of the stationary object that does not overlap the region of the moving object is then determined as a feature extraction region. Then, the image processing device extracts a feature of the stationary object from the determined feature extraction region. In this way, for example, even in presence of a moving object crossing in front of a stationary object, the image processing device can extract a feature of the stationary object without being affected by the moving object. Therefore, a feature extracted by the image processing device does not include a feature of a moving object. Thus, when verification of a stationary object is performed by using the extracted feature, accuracy of verification of this stationary object is improved.

(1.2 Configuration)

Figure 1:
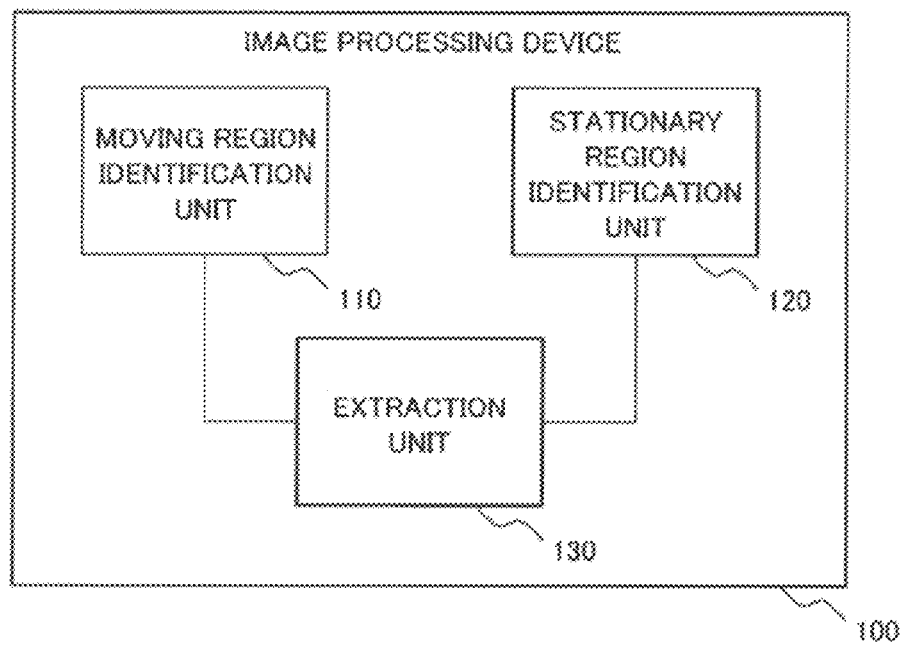
FIG. 1 is a block diagram illustrating one example of a configuration of an image processing device according to a first example embodiment.

FIG. 1 illustrates one example of a configuration of an image processing device 100 according to the present example embodiment. Hereinafter, the image processing device 100 in the present example embodiment is described with reference to FIG. 1. As illustrated in FIG. 1, the image processing device 100 includes a moving region identification unit 110, a stationary region identification unit 120, and an extraction unit 130.

The image processing device 100 receives, from a capturing device such as one or more cameras, an input of a video captured by the capturing device. A video input to the image processing device 100 includes a plurality of images (also referred to as image frames). The image processing device 100 may be configured to accept one image frame as an input. This capturing device may be, for example, a surveillance camera that captures a video. More specifically, the capturing device may be a network camera including a capturing function and a communication function. Note that, the capturing device may be a device including a function of accumulating a captured video in a storage unit thereof.

The moving region identification unit 110 identifies a region, in an image frame included in a video input to the image processing device 100, of a moving object included in the video. The moving region identification unit 110 identifies a region of a moving object by using image frames adjacent to each other in a time direction, for example. In this case, the moving region identification unit 110 compares a certain image frame with an image frame immediately before the image frame among a plurality of image frames included in a video, and identifies a position (for example, a coordinate value on the certain image frame) of a pixel having a great difference in pixel value, for example. Then, the moving region identification unit 110 identifies a region including a position of a moving region identified from these two image frames as a region of a moving object. The region of the moving object identified by the moving region identification unit 110 is indicated by a set of coordinate values when, for example, a position of a pixel identified by the moving region identification unit 110 is a coordinate value. Then, the moving region identification unit 110 associates information indicating the region of the moving object (for example, a set of coordinate values) with information indicating the certain image frame (for example, an identifier such as a number of the image frame), and supplies the information to the extraction unit 130.

Note that, a method of identifying a region of a moving object by the moving region identification unit 110 is not limited to this. The moving region identification unit 110 may identify a region of a moving object in a certain image frame by using an optical flow, for example. Further, the number of image frames used for identifying a region of a moving object by the moving region identification unit 110 is not particularly limited.

Hereinafter, a region of a moving object identified by the moving region identification unit 110 is also referred to as a moving region.

The stationary region identification unit 120 identifies a region, in an image frame included in a video input to the image processing device 100, of a stationary object included in the video. Herein, the stationary object represents a person remaining within a predetermined range for longer than or equal to a predetermined period of time, for example. Examples of the stationary object include a person standing still in a certain position for longer than or equal to a predetermined period of time, a person moving at less than or equal to a predetermined speed within a certain range for longer than or equal to a predetermined period of time, and the like. The stationary region identification unit 120 detects such a stationary object (also referred to as a stationary person) by using the method described in PTL 1, for example. Note that, a method of detecting a stationary object by the stationary region identification unit 120 is not limited to this, and any method may be used. For example, the stationary region identification unit 120 may detect a stationary object by using information (for example, an optical flow) used for identifying a moving object by the moving region identification unit 110.

The stationary region identification unit 120 identifies a region including a detected stationary object (also referred to as a region of a stationary object) in each image frame. The region of the stationary object is indicated by a set of coordinate values, for example. For example, when the stationary region identification unit 120 uses a plurality of image frames in order to detect a stationary object, the stationary region identification unit 120 may identify, in each of the image frames, a position of a stationary object included in the image frame, and identify a region including all of the identified positions as a region of a stationary object. In this way, for example, even when a stationary object included in a certain image frame is concealed by another object and thus an external shape of the stationary object is unclear on the certain image frame, the stationary region identification unit 120 can estimate a position in which the stationary object is likely to be located. Then, the stationary region identification unit 120 can identify a region of the stationary object on the image frame including this estimated position.

Note that, the stationary region identification unit 120 may detect a stationary object from one image frame. For example, when the stationary region identification unit 120 detects a posture of a person included in one image frame and the posture is, for example, a seating posture, the stationary region identification unit 120 may detect the person as a stationary object. Further, for example, when a posture of a person included in one image frame is, for example, a standing posture with both legs closed, the stationary region identification unit 120 may detect the person as a stationary object. In this way, a posture of a stationary object obtained by detecting a person as the stationary object by the stationary region identification unit 120 is not particularly limited.

A shape of a region of a stationary object identified by the stationary region identification unit 120 is not particularly limited, and may be, for example, a circle, an ellipse, and a polygon, or an external shape of the stationary object.

The stationary region identification unit 120 associates information indicating a region of a stationary object with information indicating a certain image frame, and supplies the information to the extraction unit 130. Hereinafter, a region of a stationary object identified by the stationary region identification unit 120 is also referred to as a stationary region.

Figure 2:
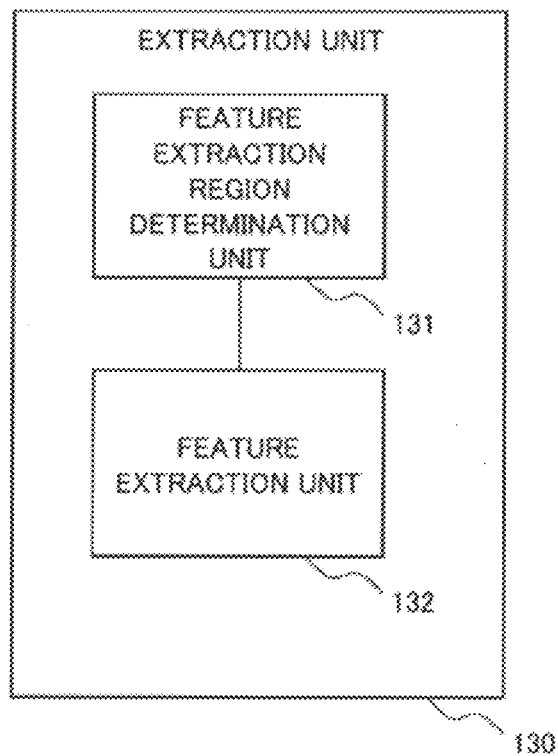
FIG. 2 is a block diagram illustrating one example of a configuration of an extraction unit in the first example embodiment.

The extraction unit 130 extracts a feature from a partial image of an image frame that is a partial image included in a region of a stationary object and is included in a region that does not overlap a region of a moving object. A function of the extraction unit 130 is further described with reference to FIG. 2. FIG. 2 is a block diagram illustrating one example of a configuration of the extraction unit 130 in the present example embodiment. As illustrated in FIG. 2, the extraction unit 130 in the present example embodiment includes a feature extraction region determination unit 131 and a feature extraction unit 132.

The feature extraction region determination unit 131 receives information indicating a moving region from the moving region identification unit 110 for each image frame. Further, the feature extraction region determination unit 131 receives information indicating a stationary region from the stationary region identification unit 120 for each image frame. Then, the feature extraction region determination unit 131 determines, by using a stationary region and a moving region associated with information indicating the same image frame, a region of the stationary region except for a portion overlapping the moving region. A region determined by this feature extraction region determination unit 131 is referred to as a feature extraction region.

Figure 3:
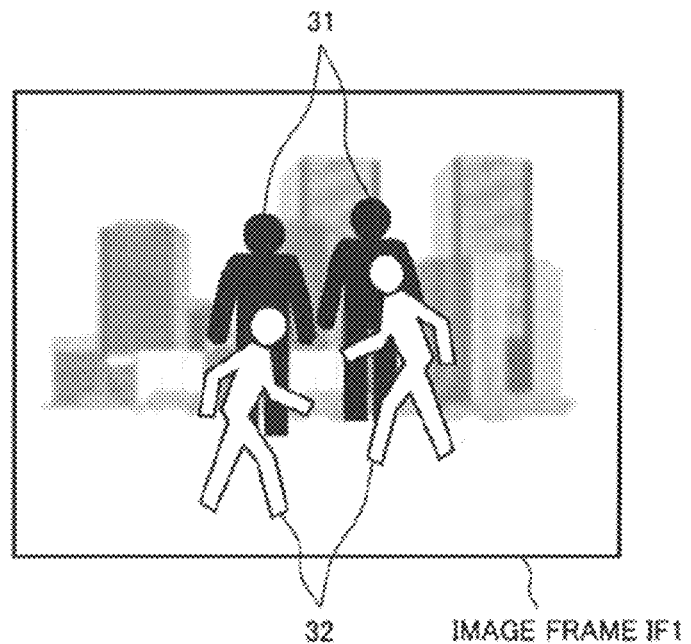
FIG. 3 is a diagram illustrating one example of an image frame captured by a capturing device.
Figure 4:
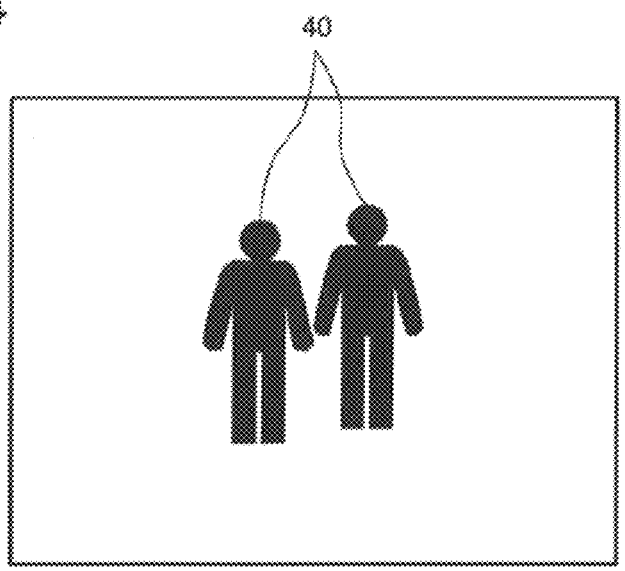
FIG. 4 is a diagram illustrating one example of a stationary region identified by a stationary region identification unit.

Herein, a feature extraction region determined by the feature extraction region determination unit 131 is further described with reference to FIGS. 3 to 6. FIG. 3 is a diagram illustrating one example of an image frame IF1 captured by a capturing device. It is assumed that a stationary object 31 and a moving object 32 are included in the image frame IF1 illustrated in FIG. 3. FIG. 4 is a diagram illustrating one example of a stationary region identified by the stationary region identification unit 120 on the image frame IF1 in FIG. 3. The stationary region identification unit 120 identifies a stationary region 40 as illustrated in FIG. 4. The stationary region identification unit 120 estimates a region of a stationary object by using a plurality of image frames including the image frame IF1, and identifies the stationary region 40 as illustrated in FIG. 4. In this way, the stationary region identification unit 120 can also identify a portion that is not captured in the image frame IF1 in FIG. 3 as a stationary region.

Figure 5:
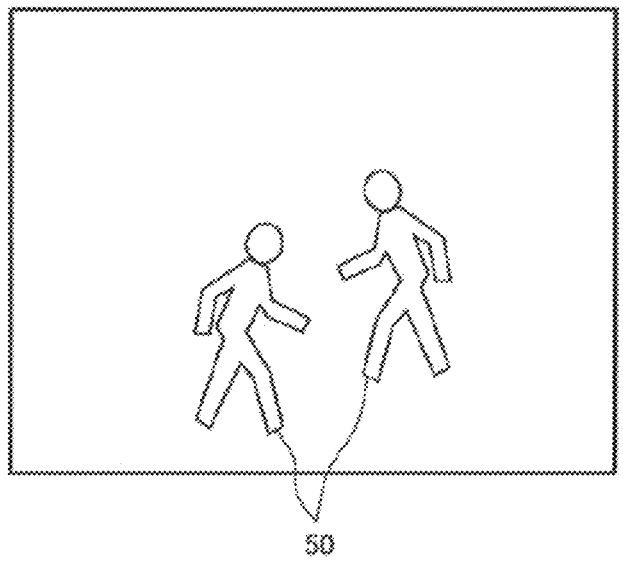
FIG. 5 is a diagram illustrating one example of a moving region identified by a moving region identification unit.

Further, FIG. 5 is a diagram illustrating one example of a moving region identified by the moving region identification unit 110 on the image frame IF1 in FIG. 3. The moving region identification unit 110 identifies a moving region 50 as illustrated in FIG. 5. The moving region identification unit 110 identifies the moving region 50 as illustrated in FIG. 5 by using a plurality of image frames including the image frame IF1.

Figure 6:
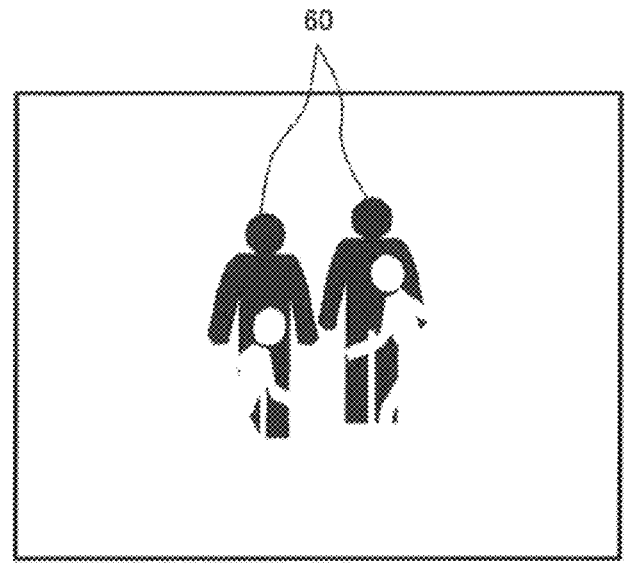
FIG. 6 is a diagram illustrating one example of a feature extraction region determined by a feature extraction region determination unit.

Then, the feature extraction region determination unit 131 determines a feature extraction region of the stationary region 40 except for a portion overlapping the moving region 50. FIG. 6 is a diagram illustrating one example of a feature extraction region determined by the feature extraction region determination unit 131. As illustrated in FIG. 6, a feature extraction region 60 determined by the feature extraction region determination unit 131 is a region of the stationary region 40 that does not overlap the moving region 50.

The feature extraction region determination unit 131 supplies information about this feature extraction region 60 to the feature extraction unit 132. The feature extraction region determination unit 131 may supply a set of coordinate values indicating the feature extraction region 60 as information about the feature extraction region 60 to the feature extraction unit 132, or may extract an image of a portion of the feature extraction region 60 from an image frame and supply the extracted image (referred to as a partial image) to the feature extraction unit 132.

The feature extraction unit 132 extracts a feature of the stationary object from the partial image being the image of the portion of the feature extraction region 60 determined by the feature extraction region determination unit 131 in the image frame. Examples of a feature extracted by the feature extraction unit 132 include color. The feature extraction unit 132 may extract a face, a body shape, behavior, and the like of a person being a stationary object as a feature. The feature extraction unit 132 outputs the extracted feature as the feature of the stationary object.

(1.3 Flow of Processing)

Next, processing of the image processing device 100 according to the present example embodiment is described with reference to FIG. 7. FIG. 7 is a flowchart illustrating one example of a flow of the processing of the image processing device 100 according to the present example embodiment.

The moving region identification unit 110 identifies a moving region being a region, in an image included in a video, of a moving object included in the video (Step S71, hereinafter simply described as S71).

Further, the stationary region identification unit 120 identifies a stationary region being a region, in the image, of a stationary object included in the video (S72). Note that, when the stationary region identification unit 120 identifies a stationary region and a specific result of a moving region is not used, Steps S71 and S72 may be performed simultaneously or performed in reverse order.

Then, the extraction unit 130 extracts a feature from a partial image of the image that is a partial image included in the region of the stationary object and is included in a region that does not overlap the region of the moving object (S73). As described above, the processing of the image processing device 100 is finished.

(1.4 Effect According to Present Example Embodiment)

As described above, the image processing device 100 according to the present example embodiment extracts a feature of a stationary object from a partial image of a region that does not overlap a moving object, and can thus prevent a feature of the moving object from being extracted as a feature of the stationary object by mistake. In this way, the image processing device 100 can accurately extract a feature of the stationary object. Therefore, when verification of a stationary object detected in a certain period of a video and a stationary object detected in another period is performed by using the feature extracted in such a manner, accuracy of verification can be increased.

In this way, the image processing device 100 according to the present example embodiment can extract information with which a stationary person being an object to be tracked can be tracked even when concealment and the like occur. Thus, according to the present example embodiment, when a stationary person being an object to be tracked is not included in an image frame by concealment and the like, the same stationary person can be prevented from being determined as a different person, and thus an object to be tracked can be tracked without escaping detection.

2 Second Example Embodiment (2.1 Outline)

An image processing device according to a second example embodiment determines a feature extraction region, and determines a feature to be extracted, based on a constituent part and an area of a stationary object included in this feature extraction region, similarly to the image processing device in the first example embodiment. In this way, a feature with which verification of a stationary object can be more stably performed can be extracted.

(2.2 Configuration)

FIG. 8 illustrates one example of a configuration of an image processing device 200 according to the present example embodiment. Hereinafter, the image processing device 200 according to the present example embodiment is described with reference to FIG. 8. Note that, in the present example embodiment, the same block as the block described in the first example embodiment is denoted by the same reference sign, and detailed description thereof is omitted.

The image processing device 200 illustrated in FIG. 8 includes an extraction unit 230 instead of the extraction unit 130 in the image processing device 100 according to the first example embodiment. As illustrated in FIG. 8, the image processing device 200 includes a moving region identification unit 110, a stationary region identification unit 120, and the extraction unit 230.

The extraction unit 230 determines a feature to be extracted, based on a constituent part of a stationary object included in a partial image, and extracts the determined feature from an image of a portion of the constituent part of the partial image. Further, the extraction unit 230 determines whether or not to extract a feature according to an area of a region of the partial image, and, when it is determined that a feature is not to be extracted, the extraction unit 230 associates a notification indicating that extraction of a feature is not performed with information indicating the image, and outputs the notification.

Figure 9:
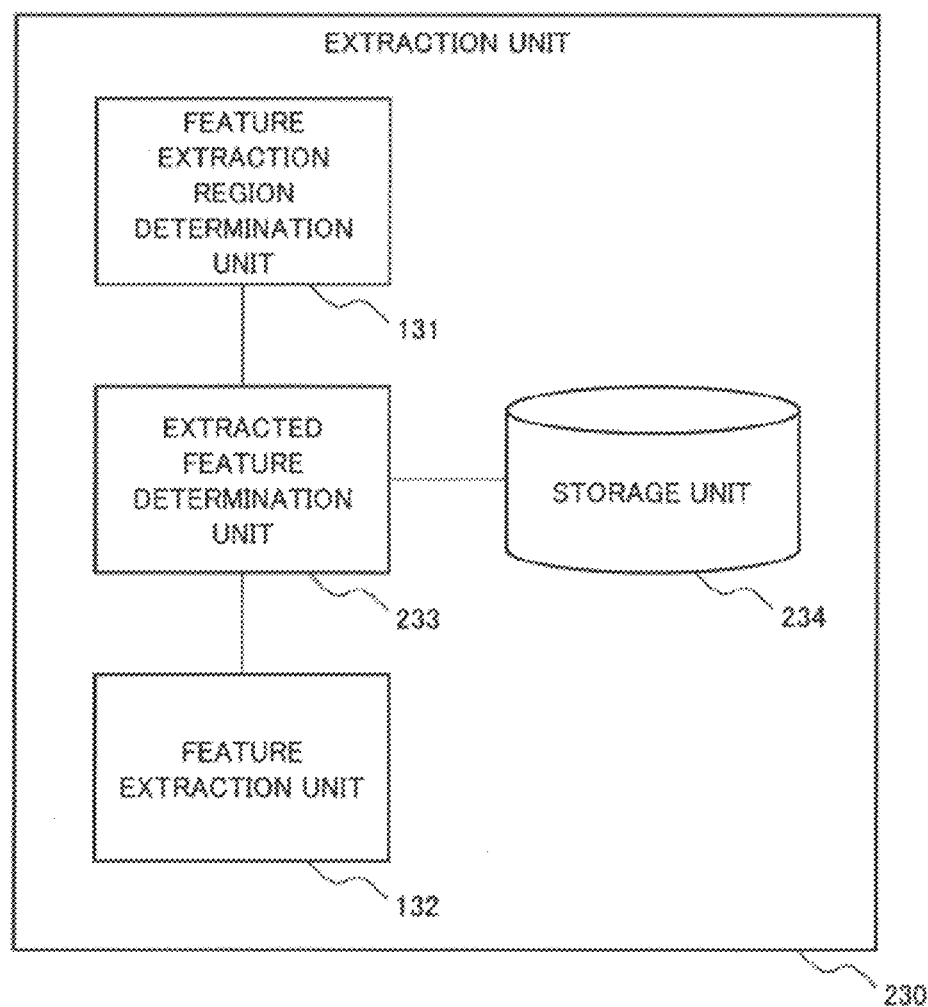
FIG. 9 is a block diagram illustrating one example of a configuration of an extraction unit in the second example embodiment.

A function of the extraction unit 230 is further described with reference to FIG. 9. FIG. 9 is a block diagram illustrating one example of a configuration of the extraction unit 230 in the present example embodiment. As illustrated in FIG. 9, the extraction unit 230 in the present example embodiment includes a feature extraction region determination unit 131, a feature extraction unit 132, an extracted feature determination unit 233, and a storage unit 234.

The extracted feature determination unit 233 determines a feature to be extracted, based on a constituent part of a stationary object included in a partial image. Herein, a constituent part of a stationary object is set as a part that constitutes a person, such as a head, an arm, a leg, an upper body, and a lower body, and a constituent unit thereof may be any unit. The extracted feature determination unit 233 determines a constituent part of a stationary object included in a partial image by comparing the partial image with a model indicating a constituent part. This model is stored in the storage unit 234. Further, information that indicates a feature to be extracted and is associated with information indicating a constituent part is stored in the storage unit 234. For example, color is associated as information indicating a feature to be extracted with information indicating an upper body, and a face is associated as information indicating a feature to be extracted with information indicating a head.

For example, when only an upper body of a stationary object is included in a partial image, the extracted feature determination unit 233 compares this partial image with the above-mentioned model, and determines that a constituent part included in the partial image is an upper body. Then, when information that indicates a feature to be extracted and is associated with information indicating an upper body is color, the extracted feature determination unit 233 determines that a feature to be extracted from the partial image of the upper body is color. The extracted feature determination unit 233 supplies the determined feature to be extracted together with information indicating the determined constituent part to the feature extraction unit 132. In this way, the feature extraction unit 132 extracts the determined feature (color in the above-mentioned example) from the image of the portion of the constituent part of the partial image (partial image of the upper body in the above-mentioned example).

Note that, the extracted feature determination unit 233 may determine whether or not to extract a feature according to a constituent part of a stationary object included in a partial image.

Further, the extracted feature determination unit 233 may determine whether or not to extract a feature according to an area of a feature extraction region determined by the feature extraction region determination unit 131. For example, when an area of a feature extraction region is smaller than a predetermined threshold value, the extracted feature determination unit 233 determines that a feature is not to be extracted from the feature extraction region. When an area of a feature extraction region is too small, a feature extracted from such a feature extraction region may not sufficiently express a feature of a stationary object. Therefore, when verification is performed by using a feature extracted from a feature extraction region having an area smaller than a predetermined threshold value, a correct result may not be obtained. In other words, a feature extracted from a feature extraction region having an area smaller than a predetermined threshold value may not be a significant feature in verification. In this way, when a feature is extracted from a feature extraction region by using all image frames and the feature may become unstable, the extracted feature determination unit 233 controls the feature extraction unit 132 in such a way that the feature extraction unit 132 does not extract the feature that may become unstable. When an area of a feature extraction region is smaller than a predetermined threshold value, the extracted feature determination unit 233 supplies information indicating that an image frame including the feature extraction region does not include a significant feature for a stationary object together with information indicating the image frame to the feature extraction unit 132.

In this way, the feature extraction unit 132 does not extract a feature from the image frame associated with the information indicating that the significant feature is not included, and can output that the image frame does not include the significant feature for the stationary object.

Further, the extracted feature determination unit 233 may determine a feature to be extracted according to an area of a feature extraction region.

Note that, the extracted feature determination unit 233 may determine presence or absence of extraction of a feature and a feature to be extracted, based on both of a constituent part of a stationary object included in a partial image and an area of a feature extraction region, or may determine presence or absence of extraction of a feature and a feature to be extracted, based on any one of a constituent part of a stationary object included in a partial image or an area of a feature extraction region.

(2.3 Flow of Processing)

Figure 10:
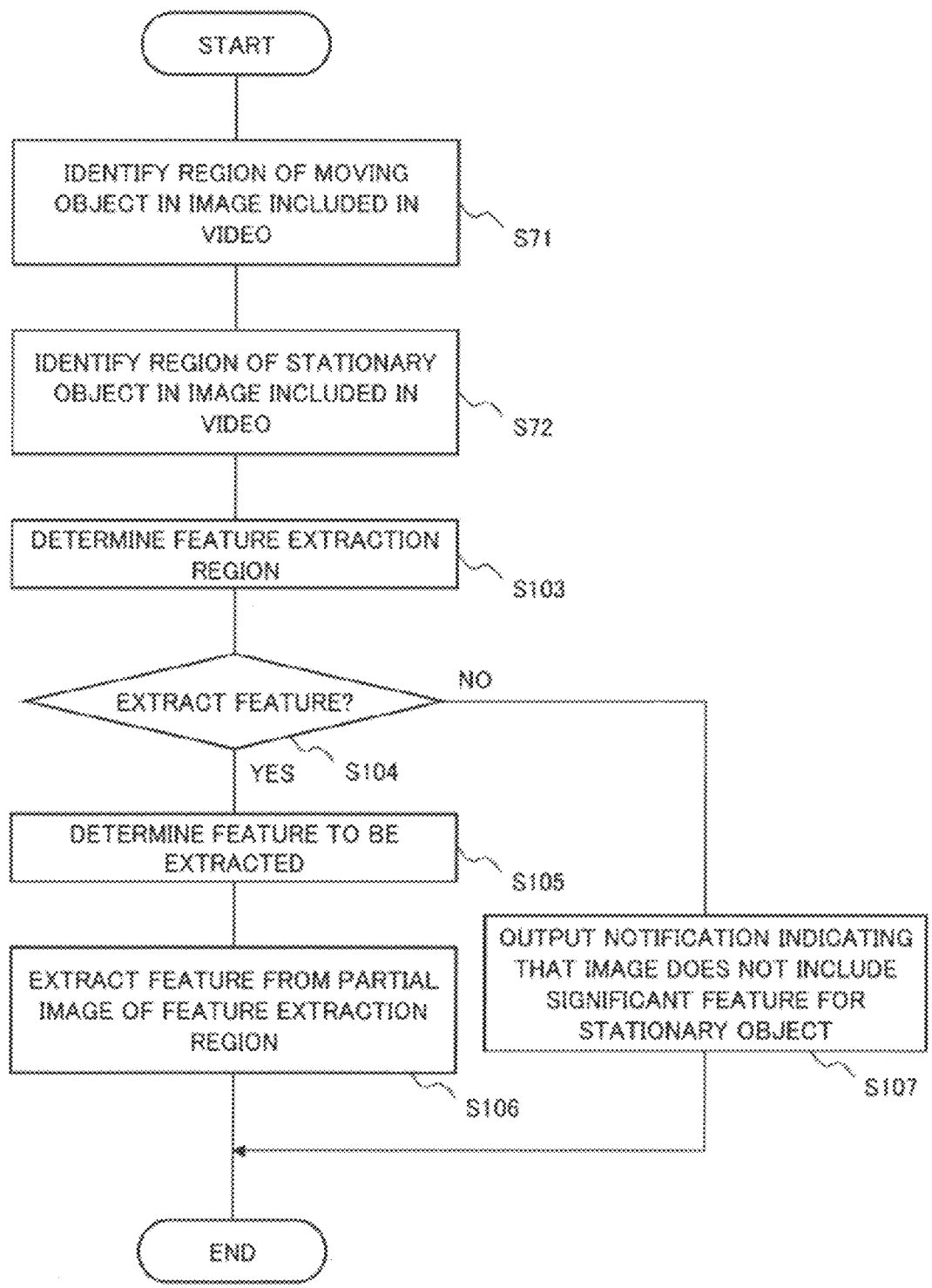
FIG. 10 is a flowchart illustrating one example of a flow of processing of the image processing device according to the second example embodiment.

Next, processing of the image processing device 200 according to the present example embodiment is described with reference to FIG. 10. FIG. 10 is a flowchart illustrating one example of a flow of the processing of the image processing device 200 according to the present example embodiment.

The moving region identification unit 110 identifies a moving region being a region, in an image included in a video, of a moving object included in the video (S71). Further, the stationary region identification unit 120 identifies a stationary region being a region, in the image, of a stationary object included in the video (S72). Note that, when the stationary region identification unit 120 identifies a stationary region and a specific result of a moving region is not used, Steps S71 and S72 may be performed simultaneously or performed in reverse order.

Then, the feature extraction region determination unit 131 of the extraction unit 130 determines a feature extraction region (S103). Then, the extracted feature determination unit 233 determines whether or not to extract a feature, based on at least one of a constituent part of the stationary object included in a partial image and an area of the feature extraction region (S104). When it is determined that a feature is to be extracted (YES in S104), the extracted feature determination unit 233 determines a feature to be extracted, based on at least one of the constituent part of the stationary object included in the partial image and the area of the feature extraction region (S105). Then, the feature extraction unit 132 extracts the feature determined in S105 from an image of the feature extraction region (namely, the partial image that is a partial image included in the region of the stationary object and is included in a region that does not overlap the region of the moving object) (S106).

Further, when it is determined that a feature is not to be extracted in S104 (NO in S104), the feature extraction unit 132 outputs a notification indicating that an image determined by the feature extraction region determination unit 131 that a feature of the stationary object is not to be extracted does not include a significant feature for the stationary object (S107).

As described above, the processing of the image processing device 200 is finished.

(2.4 Effect According to Present Example Embodiment)

As described above, the image processing device 200 according to the present example embodiment determines a feature to be extracted, based on a constituent part of a stationary object included in a partial image. In this way, the image processing device 200 can switch a feature to be extracted depending on a situation of concealment and the like of a stationary object. In this way, a device that performs verification by using a feature output from the image processing device 200 can perform verification by using features extracted from the same constituent part (for example, an upper body) instead of verifying, for example, a feature included in an upper body extracted from a certain image with a feature included in a lower body extracted from another image. Therefore, the image processing device 200 according to the present example embodiment can extract a feature with which verification of a stationary object can be more stably performed in addition to the effect of the image processing device 100 according to the first example embodiment described above.

Further, the image processing device 200 according to the present example embodiment determines whether or not to extract a feature according to an area of a region of a partial image, and, when it is determined that a feature is not to be extracted, the image processing device 200 associates a notification indicating that extraction of a feature is not performed with information indicating the image, and outputs the notification. In this way, the image processing device 200 does not extract a feature from the image associated with the information indicating that a significant feature is not included, and can output that the image does not include the significant feature for a stationary object. In this way, a device that performs verification by using a feature output from the image processing device 200 can select not to use an image that does not include a significant feature for verification of a stationary object. Therefore, the image processing device 200 can provide information that reduces occurrence of false verification.

3 Third Example Embodiment (3.1 Outline)

The image processing devices according to the first and second example embodiments may have a configuration different from that of a capturing device or may be built in a capturing device. In the present example embodiment, the above-described image processing device built in a network camera being one example of a capturing device is described. Such a network camera can also extract information with which an object to be tracked can be tracked even when concealment and the like occur, similarly to the above-described image processing devices.

(3.2 Configuration)

Figure 11:
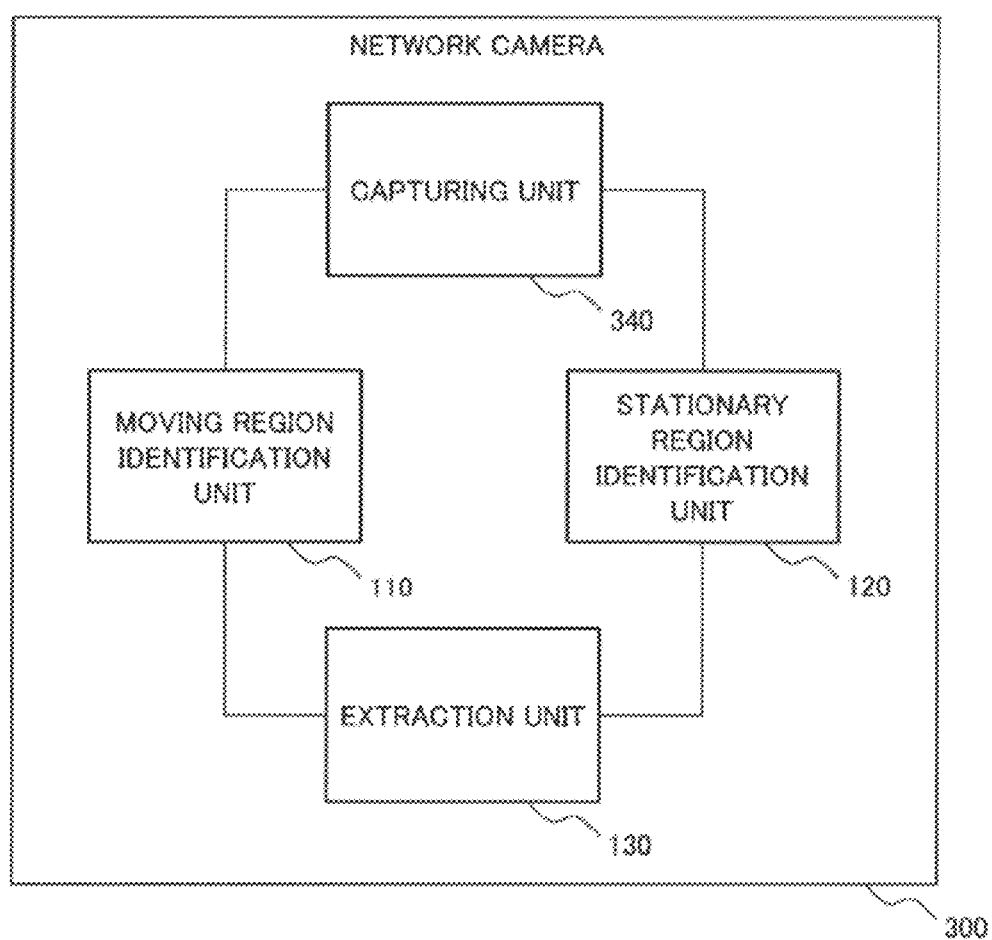
FIG. 11 is a block diagram illustrating one example of a configuration of a network camera according to a third example embodiment.

FIG. 11 illustrates one example of a configuration of a network camera 300 according to the present example embodiment. Hereinafter, the network camera 300 according to the present example embodiment is described with reference to FIG. 11. Note that, in the present example embodiment, the same block as the block described in the first example embodiment is denoted by the same reference sign, and detailed description thereof is omitted.

The network camera 300 illustrated in FIG. 11 includes a capturing unit 340 in addition to the image processing device 100 according to the first example embodiment. As illustrated in FIG. 11, the network camera 300 includes a moving region identification unit 110, a stationary region identification unit 120, an extraction unit 130, and the capturing unit 340. Note that, the network camera 300 may be configured to include the capturing unit 340 in addition to the image processing device 200 according to the second example embodiment.

The capturing unit 340 captures a video. The capturing unit 340 performs capturing processing by using, for example, a charge coupled device (CCD) sensor and a complementary metal oxide semiconductor (CMOS) sensor, and generates a video including a plurality of image frames. The capturing unit 340 supplies the generated video to the moving region identification unit 110 and the stationary region identification unit 120. In this way, the moving region identification unit 110 and the stationary region identification unit 120 can perform identification of a moving region and identification of a stationary region, respectively.

Then, the extraction unit 130 extracts a feature from a partial image of an image frame that is a partial image included in a region of a stationary object and is included in a region that does not overlap a region of a moving object.

The network camera 300 is a network camera including a communication function, and can thus send a feature extracted by the extraction unit 130 to a device that performs verification of a stationary object.

As described above, the network camera 300 according to the present example embodiment includes a function similar to that of the image processing devices according to the first and second embodiments described above. Therefore, the network camera 300 can also extract information with which an object to be tracked can be tracked even when concealment and the like occur, similarly to the image processing devices according to the first and second example embodiments described above.

4 Fourth Example Embodiment (4.1 Outline)

An image processing device according to the present example embodiment includes a function of causing a display device to display a feature extraction region differently from another region on the display device in addition to the function of the image processing devices according to the first and second example embodiments. In this way, the image processing device according to the present example embodiment allows a user to easily grasp which part of an image frame includes a stationary object being an object from which a feature is extracted.

(4.2 Configuration)

Figure 12:
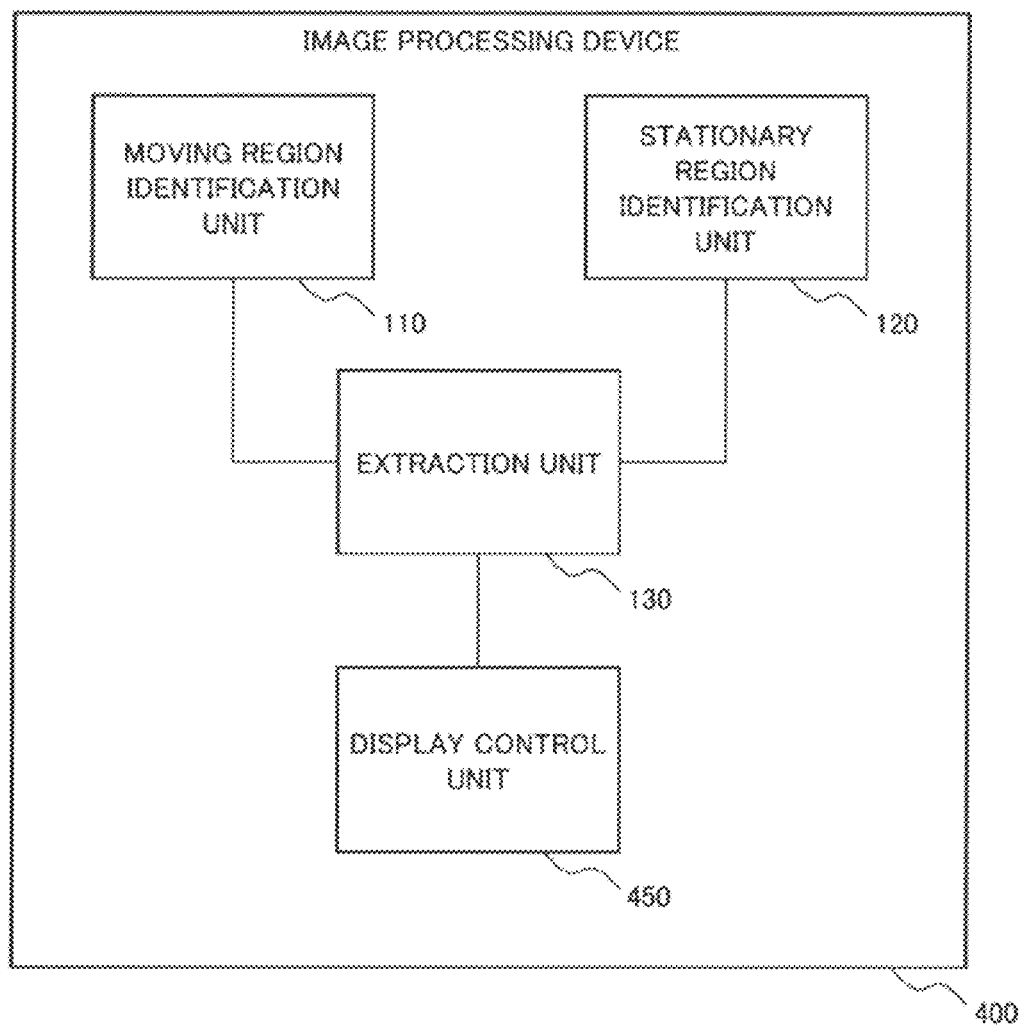
FIG. 12 is a block diagram illustrating one example of a configuration of an image processing device according to a fourth example embodiment.

FIG. 12 illustrates one example of a configuration of an image processing device 400 according to the present example embodiment. Hereinafter, the image processing device 400 according to the present example embodiment is described with reference to FIG. 12. Note that, in the present example embodiment, the same block as the block described in the first example embodiment is denoted by the same reference sign, and detailed description thereof is omitted.

The image processing device 400 illustrated in FIG. 12 includes a display control unit 450 in addition to the image processing device 100 according to the first example embodiment. As illustrated in FIG. 12, the image processing device 400 includes a moving region identification unit 110, a stationary region identification unit 120, an extraction unit 130, and the display control unit 450. Note that, the image processing device 400 may be configured to include the display control unit 450 in addition to the image processing device 200 according to the second example embodiment.

Figure 13:
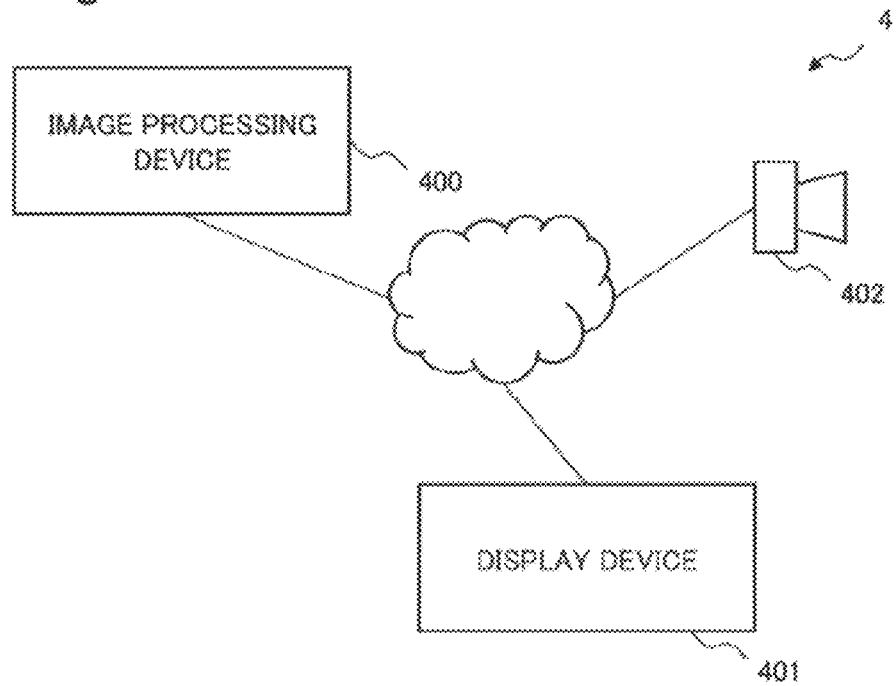
FIG. 13 is a diagram illustrating one example of a configuration of a stationary object tracking system including the image processing device according to the fourth example embodiment.

A stationary object tracking system 4 including the image processing device 400 according to the present example embodiment is described with reference to FIG. 13. FIG. 13 is a diagram illustrating one example of a configuration of the stationary object tracking system 4 including the image processing device 400 according to the present example embodiment.

As illustrated in FIG. 13, the stationary object tracking system 4 includes the image processing device 400, a display device 401, and a capturing device 402. The image processing device 400, the display device 401, and the capturing device 402 are communicably connected to one another via a network.

The capturing device 402 captures a video, and supplies the captured video to the image processing device 400. Note that, the capturing device 402 may be integrated with the image processing device 400. In this case, the image processing device 400 including the capturing device 402 includes a function similar to that of the network camera 300 described in the third example embodiment.

Further, the display device 401 receives a control signal described later being sent from the image processing device 400, and displays a screen, based on the control signal. The display device 401 is achieved by, for example, a liquid crystal display. Note that, the capturing device 402 may be integrated with the image processing device 400.

Referring back to FIG. 12, the display control unit 450 of the image processing device 400 is described. The display control unit 450 receives information indicating a feature extraction region being a region from which a feature is extracted by the extraction unit 130 together with an image frame from the extraction unit 130. The display control unit 450 controls the display device 401 in such a way that the display device 401 displays the feature extraction region being a region of a partial image to be recognizable from another region.

The display control unit 450 generates a control signal that causes the display device 401 to display, for example, only an image of a portion of the feature extraction region of the received image frame. Then, the display control unit 450 sends the generated control signal to the display device 401. In this way, the display device 401 can display the image of the portion of the feature extraction region on a screen.

Further, the display control unit 450 may add blurring processing and the like on an image of the received image frame except for an image of a portion of the feature extraction region, for example, and generate a control signal that causes the display device 401 to display the image frame after the processing. In this way, only the image of the portion of the feature extraction region is an image without blurring.

Further, the display control unit 450 may generate, for the received image frame, a control signal that causes, for example, a frame surrounding an external portion of the feature extraction region to be superimposed on the image frame and to be displayed.

In this way, the display control unit 450 may cause the display device to display a feature extraction region being a region of a partial image to be recognizable from another region, and a display method thereof is not particularly limited.

In this way, the image processing device 400 according to the present example embodiment allows a user to easily grasp which part of an image frame includes a stationary object being an object from which a feature is extracted.

5 Fifth Example Embodiment (5.1 Outline)

In the present example embodiment, a stationary object tracking system including the above-described image processing device or the above-described network camera is described. The stationary object tracking system according to the present example embodiment includes a verification unit that performs verification by using a feature extracted by an extraction unit in addition to the function of the image processing device. This verification unit performs verification of a stationary object by using a feature extracted by the extraction unit, and thus the stationary object tracking system according to the present example embodiment can track an object to be tracked even when concealment and the like occur.

(5.2 Configuration)

Figure 14:
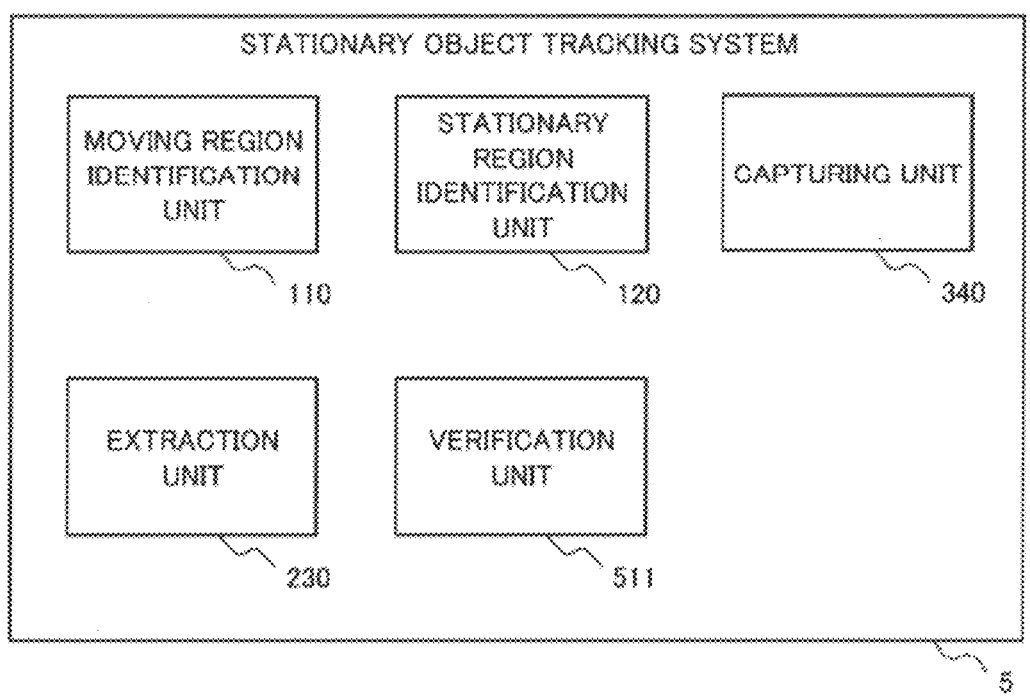
FIG. 14 is a block diagram illustrating one example of a configuration of a stationary object tracking system according to a fifth example embodiment.

FIG. 14 illustrates one example of a configuration of a stationary object tracking system 5 according to the present example embodiment. Hereinafter, the stationary object tracking system 5 according to the present example embodiment is described with reference to FIG. 14. Note that, in the present example embodiment, the same block as the block described in the each of the above-described example embodiments is denoted by the same reference sign, and detailed description thereof is omitted.

As illustrated in FIG. 14, the stationary object tracking system 5 includes a moving region identification unit 110, a stationary region identification unit 120, an extraction unit 230, a capturing unit 340, and a verification unit 511. Note that, the stationary object tracking system 5 may include an extraction unit 130 instead of the extraction unit 230. Further, the stationary object tracking system 5 may further include a display control unit 450.

Figure 15:
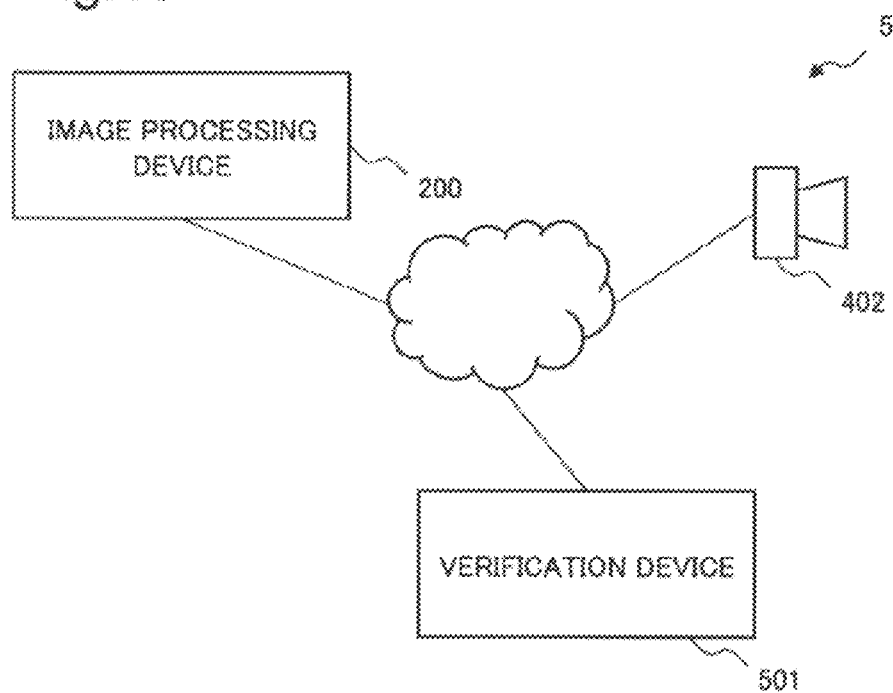
FIG. 15 is a block diagram illustrating one example of a configuration of a device in the stationary object tracking system according to the fifth example embodiment.

FIG. 15 illustrates one example of a configuration of a device that achieves each of the units in the stationary object tracking system 5. As illustrated in FIG. 15, the stationary object tracking system 5 includes an image processing device 200, a capturing device 402 that captures a video, and a verification device 501. The image processing device 200 includes the moving region identification unit 110, the stationary region identification unit 120, and the extraction unit 230 included in the stationary object tracking system 5, similarly to the image processing device 200 described in the second example embodiment. Further, the capturing device 402 includes the capturing unit 340. Further, the verification device 501 includes the verification unit 511. Note that, the verification device 501 may be integrated with the image processing device 200. Further, the image processing device 200 may be integrated with the capturing device 402 as in the above-described third example embodiment. Further, the stationary object tracking system 5 may be configured to further include a display device 401. In this way, a configuration of a device included in the stationary object tracking system 5 is not particularly limited.

The verification unit 511 performs verification of a stationary object by using a feature extracted from one or a plurality of images included in a first period of a video and a feature extracted from one or a plurality of images included in a second period different from the first period. Herein, the period is a period in which a plurality of continuous image frames including the same stationary object are captured. Whether or not the same stationary object is included in a plurality of continuous image frames can be checked by using a general technique for detecting a stationary object, and thus detailed description thereof is omitted. Further, the verification unit 511 determines whether or not the extraction unit 230 extracts a feature according to an area of a region of a partial image, and, when it is determined that a feature is not to be extracted, the verification unit 511 receives a notification indicating that extraction of a feature is not performed together with information indicating an image frame from the extraction unit 230. When the verification unit 511 receives the notification, the verification unit 511 performs verification of a stationary object by using a feature extracted from an image of an image included in the second period except for an image related to the notification, based on the notification.

Figure 16:
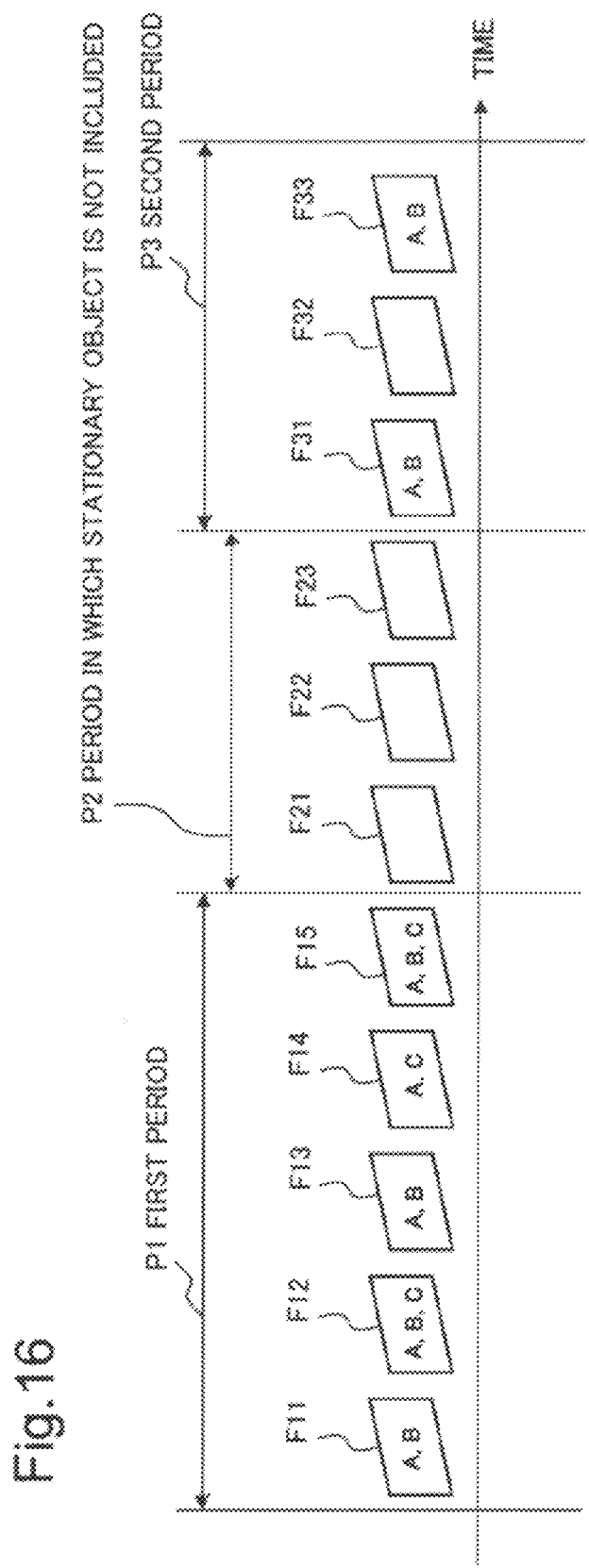
FIG. 16 is a diagram describing processing of a verification unit in the stationary object tracking system according to the fifth example embodiment.

The processing of verification performed by the verification unit 511 is further described by using FIG. 16. FIG. 16 is a diagram describing the processing of the verification unit 511 in the stationary object tracking system 5 according to the fifth example embodiment.

A horizontal axis in FIG. 16 is a time axis. The capturing unit 340 captures a video including a plurality of image frames (F11 to F15, F21 to F23, and F31 to F33). It is assumed that one stationary object is included in the image frames F11 to F15 and the image frames F31 to F33. Further, it is assumed that a stationary object is not included in the image frames F21 to F23. As illustrated in FIG. 16, it is assumed that a period in which the image frames F11 to F15 are captured is a first period P1, a period in which the image frames F21 to F23 are captured is a period P2 in which a stationary object is not included, and a period in which the image frames F31 to F33 are captured is a second period P3.

Characters of A, B, and C described in the image frames each represent a feature of a stationary object. For example, the stationary object included in the image frame F11 includes a feature A and a feature B. In other words, a character described in an image frame represents a feature extracted by the extraction unit 130.

It can be seen from the image frames F11 to F15 captured in the first period P1 that the stationary object included in the image frames F11 to F15 includes the feature A, the feature B, and a feature C. The extraction unit 230 extracts these features (the feature A, the feature B, or the feature C) from each of the image frames. For example, the extraction unit 230 extracts the feature A and the feature B from the image frame F11. The verification unit 511 may determine features of the stationary object in the plurality of image frames F11 to F15 included in the first period P1 as the feature A, the feature B, and the feature C from the features extracted by the extraction unit 230 in such a manner. Further, the verification unit 511 may determine a predetermined number of features having a higher extraction frequency of features extracted from each of the plurality of image frames F11 to F15 included in the first period P1 as features for the image frames F11 to F15 included in the first period P1.

A stationary object is not included in the image frames F21 to F23 included in the period P2 in which a stationary object is not included, and thus the stationary region identification unit 120 does not identify a stationary region in the image frames F21 to F23. Therefore, the extraction unit 230 and the verification unit 511 do not perform processing on each of the image frames F21 to F23 included in this period P2 in which a stationary object is not included.

Further, it is assumed that a stationary object is included in the image frames F31 to F33 captured in the second period P3. It is assumed that, at this time, the extraction unit 230 extracts the feature A and the feature B from the image frames F31 and F33. Further, it is assumed that an area of a feature extraction region determined from the image frame F32 is smaller than a predetermined threshold value. Therefore, the extraction unit 230 does not extract a feature from the image frame F32, and outputs a notification indicating that the image frame F32 does not include a significant feature for the stationary object to the verification unit 511.

When the verification unit 511 receives the feature A and the feature B being the features of the image frame F31 from the extraction unit 230, the verification unit 511 performs verification of the stationary object by using the features extracted from each of the image frames F11 to F15 included in the first period P1 and the features extracted from the image frame F31 by using the feature A and the feature B. Note that, the verification unit 511 may perform verification of the stationary object by using the features for the image frames F11 to F15 determined by using the features extracted from each of the image frames F11 to F15 included in the first period P1 and the features extracted from the image frame F31.

The feature A and the feature B coincide with the features of the stationary object included in the image frames F11 to F15, and thus the verification unit 511 determines that the stationary object included in the image frame F31 is the same as the stationary object included in each of the image frames in the first period P1. The verification unit 511 may output a verification result to, for example, the display device.

Further, when the verification unit 511 receives the notification indicating that the image frame F32 does not include the significant feature for the stationary object from the extraction unit 230, the verification unit 511 does not perform verification of the stationary object on this image frame F32. Then, when the verification unit 511 receives a feature of the stationary object included in a next image frame (the image frame F33) from the extraction unit 230, the verification unit 511 performs verification of the stationary object included in the image frame F33 and the stationary object included in each of the image frames in the first period P1 by using the feature. In this way, the verification unit 511 performs verification of the stationary object by using the feature extracted from the image frames (the image frame F31 and the image frame F33) included in the second period P3 other than the image frame (the image frame F32 in this example) related to the received notification.

(5.3 Flow of Processing)

Figure 17:
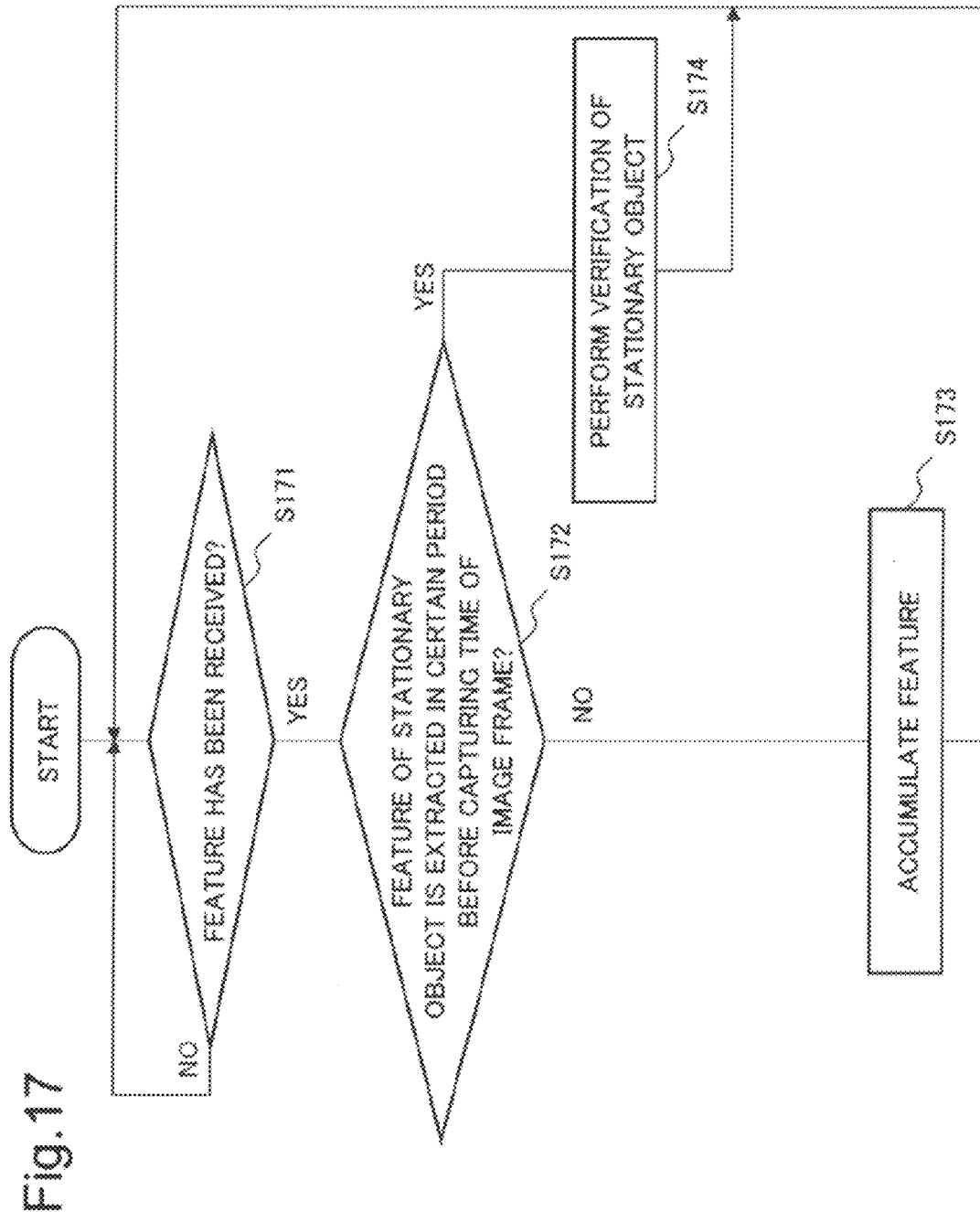
FIG. 17 is a flowchart illustrating one example of a flow of the processing of the verification unit in the stationary object tracking system according to the fifth example embodiment.

Next, processing of the verification unit 511 in the stationary object tracking system 5 according to the present example embodiment is described with reference to FIG. 17. FIG. 17 is a flowchart illustrating one example of a flow of the processing of the verification unit 511 in the stationary object tracking system 5 according to the present example embodiment. The processing illustrated in FIG. 17 is performed on each image frame.

As illustrated in FIG. 17, the verification unit 511 checks whether or not to have received a feature for a certain image frame from the extraction unit 230 (S171). When a feature has not been received (NO in S171), S171 is repeated until a feature is received next. "When a feature has not been received" represents when a stationary object is not included in an image frame being an object to be processed, or represents when a notification indicating that the image frame does not include a significant feature for a stationary object has been received from the extraction unit 230.

When a feature has been received (YES in S171), the verification unit 511 checks whether or not a feature of a stationary object is extracted in a period different from a period including an image frame being an object to be processed before a capturing time of the image frame (S172). In a case of the video illustrated in FIG. 16, when an image frame being an object to be processed is any of the image frames F11 to F15, there is no period in which a feature of the stationary object is extracted before a period (the first period P1) including the image frame. Thus, in such a case, NO is made in S172, and the verification unit 511 accumulates the feature extracted for the image frame being the object to be processed inside the verification unit 511, in a storage unit, which is not illustrated, or the like (S173).

When a feature of a stationary object is extracted in a period different from a period including an image frame being an object to be processed before a capturing time of the image frame (YES in S172), the processing proceeds to Step S174. In a case of the video illustrated in FIG. 16, when an image frame being an object to be processed is any of the image frames F31 to F33, there is the first period P1 being a period in which a feature of a stationary object is extracted before a period (the second period P3) including the image frame. Thus, in such a case, YES is made in S172, and the verification unit 511 verifies, by using the feature extracted for the image frame being the object to be processed, the stationary object included in the image frame with the stationary object included in the image frame captured in the first period P1 (S174).

As described above, in the stationary object tracking system 5 according to the present example embodiment, the verification unit 511 performs verification of a stationary object by using a feature extracted by the extraction unit 230. As described in the second example embodiment, the extraction unit 230 extracts a feature of a stationary object from a partial image of a region that does not overlap a moving object. Thus, a feature extracted by the extraction unit 230 does not include a feature of a moving object, and a feature of a stationary object is accurately extracted. Therefore, the verification unit 511 performs verification of a stationary object detected in a certain period of a video and a stationary object detected in another period by using a feature extracted in such a manner, and thus the stationary object tracking system 5 according to the present example embodiment can increase accuracy of verification. As a result, the stationary object tracking system 5 can detect the number of times of stationary states of a stationary object included in the video without continuously tracking the stationary object throughout the video. In this way, the stationary object tracking system 5 can efficiently detect such suspicious behavior that the same person stays stationary for a plurality of times.

In this way, even when a stationary person being an object to be tracked is not included in an image frame by concealment and the like, the stationary object tracking system 5 according to the present example embodiment can verify the same stationary person by using the same feature, and can thus track the object to be tracked without failing in detection.

6 With Regard to Hardware Configuration

Figure 18:
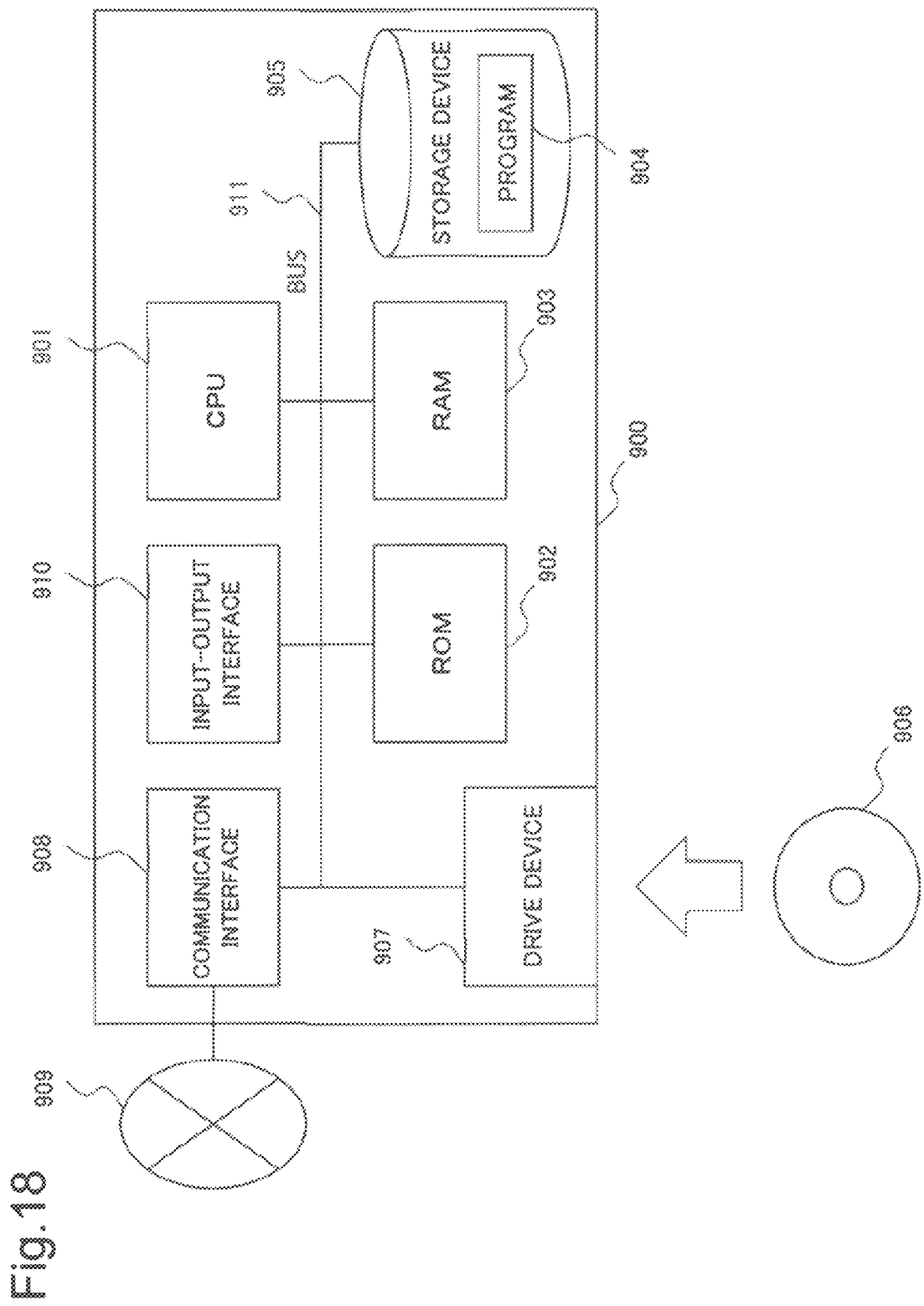
FIG. 18 is a diagram exemplifying a hardware configuration of a computer (information processing device) that can achieve each of the example embodiments of the present disclosure.

Each of components of each of devices represents a block of a functional unit in each of the example embodiments of the present disclosure. A part or the whole of each of the components of each of the devices is achieved by, for example, any combination of an information processing device 900 as illustrated in FIG. 18 and a program. FIG. 18 is a block diagram illustrating one example of a hardware configuration of the information processing device 900 that achieves each of the components of each of the devices. As one example, the information processing device 900 includes configurations as follows.

a central processing unit (CPU) 901
 a read only memory (ROM) 902
 a random access memory (RAM) 903
 a program 904 loaded into the RAM 903
 a storage device 905 that stores the program 904
 a drive device 907 that reads and writes a recording medium 906
 a communication interface 908 connected to a communication network 909
 an input-output interface 910 that inputs and outputs data
 a bus 911 that connects components Each of the components of each of the devices in each of the example embodiments is achieved by the CPU 901 acquiring and executing the program 904 that achieves a function thereof. The program 904 that achieves a function of each of the components of each of the devices is previously stored in the storage device 905 and the RAM 903, for example, and is read by the CPU 901 as necessary. Note that, the program 904 may be supplied to the CPU 901 via the communication network 909, or may be previously stored in the recording medium 906 and read by the drive device 907 to be supplied to the CPU 901.

A method of achieving each of the devices has various modification examples. For example, each of the devices may be achieved by any combination of each separate information processing device 900 for each component and a program. Alternatively, a plurality of components provided in each of the devices may be achieved by any combination of one information processing device 900 and a program.

A part or the whole of each of the components of each of the devices may be achieved by another general-purpose or special circuit, a processor, and the like, or achieved by a combination thereof. The circuit, the processor, and the like may be formed by a single chip or formed by a plurality of chips connected to one another via a bus.

A part or the whole of each of the components of each of the devices may be achieved by a combination of the above-described circuit and the like and a program.

When a part or the whole of each of the components of each of the devices is achieved by a plurality of information processing devices, circuits, or the like, the plurality of information processing devices, circuits, or the like may be arranged in a concentrated manner or a distributed manner. For example, the information processing devices, the circuits, and the like may be achieved as a form in which each is connected via a communication network, such as a client server system or a cloud computing system.

Note that, each of the example embodiments described above is a suitable example embodiment in the present disclosure, and a range of the present disclosure is not limited only to each of the above-mentioned example embodiments. A person skilled in the art can modify and substitute each of the above-mentioned example embodiments in a range without departing from the purpose of the present disclosure, and can construct an embodiment subjected to various modifications. Furthermore, a new technical feature can be formed by combining technical means disclosed in the example embodiments.

7 Supplementary Note

A part or the whole of the above-mentioned example embodiments may also be described in Supplementary Notes below, which is not limited thereto.

[Supplementary Note 1]
An image processing device, including:
a moving region identification means for identifying a region, in an image included in a video, of a moving object included in the video;
a stationary region identification means for identifying a region, in the image, of a stationary object included in the video; and
an extraction means for extracting a feature from a partial image of the image that is a partial image included in a region of the stationary object and is included in a region that does not overlap a region of the moving object.

[Supplementary Note 2]
The image processing device according to Supplementary Note 1, wherein
the extraction means determines a feature to be extracted, based on a constituent part of a stationary object included in the partial image, and extracts the determined feature from an image of a portion of a constituent part of the partial image.

[Supplementary Note 3]
The image processing device according to Supplementary Note 1 or 2, wherein
the extraction means determines whether or not to extract a feature according to an area of a region of the partial image, and, when it is determined that a feature is not to be extracted, the extraction means associates a notification indicating that extraction of a feature is not performed with information indicating the image, and outputs the notification.

[Supplementary Note 4]
The image processing device according to any one of Supplementary Notes 1 to 3, further including
a display control means for controlling a display device in such a way as to display a region of the partial image to be recognizable from another region.

[Supplementary Note 5]
A stationary object tracking system, including:
the image processing device according to any one of Supplementary Notes 1 to 4;
a capturing means for capturing the video; and
a verification means for performing verification of a stationary object included in the video by using a feature extracted by the extraction means.

[Supplementary Note 6]
The stationary object tracking system according to Supplementary Note 5, wherein
the verification means performs verification of the stationary object by using a feature extracted from one or a plurality of images included in a first period of the video and a feature extracted from one or a plurality of images included in the second period different from the first period.

[Supplementary Note 7]
The stationary object tracking system according to Supplementary Note 6, wherein
the extraction means determines whether or not to extract a feature according to an area of a region of the partial image, and, when it is determined that a feature is not to be extracted, the extraction means associates a notification indicating that extraction of a feature is not performed with information indicating the image, and outputs the notification to the verification means, and
the verification means performs verification of the stationary object by using a feature extracted from an image of an image included in the second period except for an image related to the notification, based on the notification.

[Supplementary Note 8]
An image processing method, including:
identifying a region, in an image included in a video, of a moving object included in the video;
identifying a region, in the image, of a stationary object included in the video; and
extracting a feature from a partial image of the image that is a partial image included in a region of the stationary object and is included in a region that does not overlap a region of the moving object.

[Supplementary Note 9]
The image processing method according to Supplementary Note 8, further including
determining a feature to be extracted, based on a constituent part of a stationary object included in the partial image, and extracting the determined feature from an image of a portion of a constituent part of the partial image.

[Supplementary Note 10]
A stationary object tracking method, including:
capturing a video;
identifying a region, in an image included in the video, of a moving object included in the video;
identifying a region, in the image, of a stationary object included in the video;
extracting a feature from a partial image of the image that is a partial image included in a region of the stationary object and is included in a region that does not overlap a region of the moving object; and
performing verification of a stationary object included in the video by using a feature extracted by the extraction means.

[Supplementary Note 11]
The stationary object tracking method according to Supplementary Note 10, further including
determining a feature to be extracted, based on a constituent part of a stationary object included in the partial image, and extracting the determined feature from an image of a portion of a constituent part of the partial image.

[Supplementary Note 12]
A computer-readable non-temporary recording medium that records a program causing a computer to perform:
processing of identifying a region, in an image included in a video, of a moving object included in the video;
processing of identifying a region, in the image, of a stationary object included in the video; and
processing of extracting a feature from a partial image of the image that is a partial image included in a region of the stationary object and is included in a region that does not overlap a region of the moving object.

[Supplementary Note 13]
The recording medium according to Supplementary Note 12, wherein
the processing of extracting the feature determines a feature to be extracted, based on a constituent part of a stationary object included in the partial image, and extracts the determined feature from an image of a portion of a constituent part of the partial image.

REFERENCE SIGNS LIST 4, 5 Stationary object tracking system
100 Image processing device
110 Moving region identification unit
120 Stationary region identification unit
130 Extraction unit
131 Feature extraction region determination unit
132 Feature extraction unit 200 Image processing device
230 Extraction unit
233 Extracted feature determination unit
234 Storage unit
300 Network camera
340 Capturing unit
400 Image processing device
401 Display device
402 Capturing device
450 Display control unit
501 Verification device
511 Verification unit

The invention claimed is:

1. A system comprising:
at least one memory storing instructions; and
at least one processor connected to the at least one memory and configured to execute the instructions to:
detect a person from a video composed of a plurality of image frames;
identify the detected person as a staying person in response to detection of a seating posture of the person detected from the video, by detecting a seating posture of the person remaining within a predetermined range for longer than or equal to a predetermined period of time;
identify a stationary region including the person detected from the video for each image frame, when identifying the staying person based on the posture;
identify a moving region including a moving object from the video for the each image frame;
extract a feature from an image of a feature extraction region obtained by removing a portion overlapping the moving region from the stationary region for the each image frame; and
determine a predetermined number of features having a higher extraction frequency of features extracted from the each image frame as features for the each image frame.

2. The system according to claim 1, wherein the at least one processor is configured to execute the instructions to
determine a feature to be extracted, based on a constituent part of the staying person included in the image of the feature extraction region.

3. The system according to claim 2, wherein the at least one processor is configured to execute the instructions to
determine the constituent part of the staying person included in the image of the feature extraction region by comparing the image with a model indicating a constituent part.

4. A method comprising:
detecting a person from a video composed of a plurality of image frames;
identifying the detected person as a staying person in response to detection of a seating posture of the person detected from the video, by detecting a seating posture of the person remaining within a predetermined range for longer than or equal to a predetermined period of time;
identifying a stationary region including the person detected from the video for each image frame, when identifying the staying person based on the posture;
identifying a moving region including a moving object from the video for the each image frame;
extracting a feature from an image of a feature extraction region obtained by removing a portion overlapping the moving region from the stationary region for the each image frame; and
determining a predetermined number of features having a higher extraction frequency of features extracted from the each image frame as features for the each image frame.

5. The method according to claim 4, further comprising
determining a feature to be extracted, based on a constituent part of the staying person included in the image of the feature extraction region.

6. The method according to claim 5, further comprising
determining the constituent part of the staying person included in the image of the feature extraction region by comparing the image with a model indicating a constituent part.

7. A non-transitory program recording medium that records a program causing a computer to execute:
detecting a person from a video composed of a plurality of image frames;
identifying the detected person as a staying person in response to detection of a seating posture of the person detected from the video, by detecting a seating posture of the person remaining within a predetermined range for longer than or equal to a predetermined period of time;
identifying a stationary region including the person detected from the video for each image frame, when identifying the staying person based on the posture;
identifying a moving region including a moving object from the video for the each image frame;
extracting a feature from an image of a feature extraction region obtained by removing a portion overlapping the moving region from the stationary region for the each image frame; and
determining a predetermined number of features having a higher extraction frequency of features extracted from the each image frame as features for the each image frame.

8. The non-transitory program recording medium according to claim 7, wherein the program causes a computer to further execute
determining a feature to be extracted, based on a constituent part of the staying person included in the image of the feature extraction region.

9. The non-transitory program recording medium according to claim 8, wherein the program causes a computer to further execute
determining the constituent part of the staying person included in the image of the feature extraction region by comparing the image with a model indicating a constituent part.

* * * * *